US009137712B2

(12) United States Patent
Ianev et al.

(10) Patent No.: US 9,137,712 B2
(45) Date of Patent: Sep. 15, 2015

(54) NETWORK UPDATE PROCEDURE AND RELATED NETWORK DEVICES

(75) Inventors: Iskren Ianev, Reading (GB); Yannick Lair, Reading (GB)

(73) Assignee: LENOVO INNOVATIONS LIMITED (HONG KONG), Quarry Bay (HK)

( * ) Notice: Subject to any disclaimer, the term of this patent is extended or adjusted under 35 U.S.C. 154(b) by 0 days.

(21) Appl. No.: 13/577,850

(22) PCT Filed: Jan. 24, 2011

(86) PCT No.: PCT/JP2011/051840
§ 371 (c)(1),
(2), (4) Date: Aug. 8, 2012

(87) PCT Pub. No.: WO2011/099388
PCT Pub. Date: Aug. 18, 2011

(65) Prior Publication Data
US 2012/0309357 A1 Dec. 6, 2012

(30) Foreign Application Priority Data

Feb. 15, 2010 (GB) .................................. 1002446.1

(51) Int. Cl.
*H04W 36/00* (2009.01)
*H04W 60/04* (2009.01)
*H04W 92/24* (2009.01)

(52) U.S. Cl.
CPC .......... *H04W 36/0022* (2013.01); *H04W 60/04* (2013.01); *H04W 92/24* (2013.01)

(58) Field of Classification Search
CPC ... H04W 76/00; H04W 76/021; H04W 76/25; H04W 76/27; H04W 76/28
USPC ..................... 455/456.1, 411, 435.1; 370/331
See application file for complete search history.

(56) References Cited

U.S. PATENT DOCUMENTS

2002/0077109 A1* 6/2002 Rasanen ....................... 455/450
2003/0114158 A1* 6/2003 Soderbacka et al. .......... 455/436
(Continued)

FOREIGN PATENT DOCUMENTS

CN 1350752 A 5/2002
CN 1605222 A 4/2005
(Continued)

OTHER PUBLICATIONS

Communication dated Aug. 5, 2014, issued by the State Intellectual Property Office of the People's Republic of China in counterpart Application No. 201180009546.8.
"3GPP TS 23.272 V9.2.0, Dec. 2009, pp. 16-18".

*Primary Examiner* — George Eng
*Assistant Examiner* — Joseph Dean, Jr.

(57) ABSTRACT

The invention provides a method of controlling LA-based update procedure in a mobile radio communications network, and including the step of determining the reason for the LA-based update request, and varying connection procedures upon receipt of such request and responsive to the determination, and so can also provide a mobile radio communications network device arranged for operation in the network including plural terminal devices, the network device being arranged to forward to a target network device an indication of reasoning for a LA-based update procedure (during CSFB to the legacy system for example). Further the invention can also be embodied in a mobile radio communications network target device arranged for operation in the network including plural terminal devices and further arranged to monitor for an indication from a network device for reasoning for a LA-based update procedure, and further arranged to vary a connection procedure responsive to the said monitoring.

24 Claims, 5 Drawing Sheets

(56) References Cited

U.S. PATENT DOCUMENTS

| | | | |
|---|---|---|---|
| 2009/0238143 A1* | 9/2009 | Mukherjee et al. | 370/331 |
| 2010/0273504 A1* | 10/2010 | Bull et al. | 455/456.1 |
| 2011/0070900 A1* | 3/2011 | Shi et al. | 455/458 |

FOREIGN PATENT DOCUMENTS

| | | |
|---|---|---|
| CN | 1937825 A | 3/2007 |
| JP | 2002-165259 A | 6/2002 |
| WO | 2009/057730 A2 | 5/2009 |

\* cited by examiner

NETWORK UPDATE PROCEDURE AND RELATED NETWORK DEVICES

CROSS REFERENCE TO RELATED APPLICATIONS

This application is a National Stage of International Application No. PCT/JP2011/051840 filed Jan. 24, 2011, claiming priority based on United Kingdom Patent Application No. 1002446.1 filed Feb. 15, 2010, the contents of all of which are incorporated herein by reference in their entirety.

TECHNICAL FIELD

The present invention relates to a network update procedure and to related network devices, and, in particular, to Location Area updates within a mobile radio communications network.

BACKGROUND ART

Due to the very nature of a mobile radio communications network, such as a cellular network, there often arises a requirement for a mobile terminal device such as so-called User Equipment to change its manner of operation whether due to a handover between cells and/or a handover between networks and related communication systems.

In view of the wide variety of communication systems, and in particular legacy communication systems that are in existence, to optimise connectivity and to minimize limiting effects on handset terminal performance, functionality allowing movement between different systems can provide particular advantageous.

SUMMARY OF INVENTION

Technical Problem

However, in view of the requirements of such different systems, it is often disadvantageously found that noticeable delays arise when both seeking to switch between such systems and subsequently establishing connectivity within the new system.

The present invention seeks to provide for a method of controlling update procedures within a network system and having advantages over known such procedures.

As a further illustration, according to current 3GPP Rel-8 and Rel-9 specifications, when the User Equipment (UE) moves to legacy 2G/3G systems from, for example, an Evolved Packet System (EPS) which will generally be for Circuit Switched Fall Back (CSFB) purposes, the UE can initially be arranged to determine the Location Area (LA) within the new cell.

If the LA is identified as having changed, the UE initially performs a LA update procedure. If the target 2G/3G system is in a Network Mode of Operation (NMO) II then an LA update procedure is performed, whereas if the target 2G/3G system is in NMO I as defined in 3GPP technical specification 23 272, a combined RA (Routing Area)/LA update procedure is performed. Subsequent to the update procedure, a UE then continues with the circuit switched call establishment.

It is recognised that a potential limitation with CSFB is the additional delay required to establish call set-up. In particular, it is noted that it takes a relatively long time for the UE in CSFB to switch to the legacy target 2G/3G system, whether via handover or NACC (Network Assisted Cell Change), or whether via connection re-direction, and further delay is also experienced when it is required to make or to answer a circuit switched call.

As examples, typical added delays in the call-setup procedure within CSFB can be in the order of between two and five seconds.

It is also noted that, upon the UE attempting a LA or combined RA/LA update in CSFB, the delay could be further exasperated if the mobile switching centre (MSC) or the serving GPRS (General Packet Radio Service) support mode (SGSN) is controlled to run some or all of the security procedures such as, for example, the authentication procedure, identification procedure and/or TMSI (Temporary Mobile Subscriber Identity) re-allocation procedure.

Since some of these procedures also involve reading of the SIM (Subscriber Identity Module)/USIM (Universal SIM) card, they can be considered as potential sources of considerable extra delay to calls set up within CSFB.

The present invention in particular seeks to provide for system update procedures, and related network devices, which can offer advantages over such known limitations.

Solution to Problem

According to the first aspect of the present invention there is provided a method of controlling Location Area-based update procedure in a mobile radio communications network, and including the step of determining the reason for the Location Area-based update request, and varying connection procedures upon receipt of such request and responsive to the said determination.

Unnecessary connection procedures can then readily be avoided so as to reduce delays associated with the update.

As will be appreciated, the determination can control the connection procedure of a network element.

The method can include the step of providing at a network element an indication of the said reason for the Location Area-based update request.

As the step of determining the said reason within a target network element, can also be provided and the said target network element can comprise a Mobile Switching Centre or a Serving GPRS Support Node.

The connection procedure can comprise a security procedure and in the form of at least one of authentication procedure, an identification procedure or a TMSI re-allocation procedure.

Of course the said step of determining the reason for the update request can be based on service-type signalling and/or a determination of whether Circuit Switched Fall-Back is required.

Advantageously a time period responsive to result of the said determination step, can be provided and the method can further include the step of monitoring for a Location Area-based update request during the said time period.

According to another aspect of the present invention there is provided a mobile radio communications network device arranged for operation in the network including a plurality of terminal devices, the network device being arranged to forward to a target network device an indication of reasoning for a Location Area-based update procedure.

According to a further aspect of the present invention there is provided a mobile radio communications network target device arranged for operation in the network including a plurality of terminal devices and further arranged to monitor for an indication from a network device as defined above for reasoning for a Location Area-based update procedure, and further arranged to vary a connection procedure responsive to the said monitoring.

The target device can be arranged to vary connection procedure responsive to identification of a relocation request originating from a terminal device, or can further be arranged to vary connection procedure responsive to identification of a service request originating from a terminal device.

In particular, the target device can be arranged to vary connection procedure responsive to identification of a Circuit Switched Fall-Back originating from a terminal device.

The target device can also include means for establishing a time period and arranged to monitor for receipt of a Location Area-based update during said time period and so as to initiate variation in the connection procedure.

Advantageous Effects of Invention

According to one particular aspect of the present invention therefore it can be appreciated that the control arrangement advantageously seeks to make the MSC/SGSN aware of the requirement behind the request for the LA update procedure, whether or not the update procedure is for CSFB purposes such that connectivity procedure such as the related security procedures can be employed in a modified and, ideally, less intensive manner.

DESCRIPTION OF EMBODIMENTS

Exemplary embodiments of the invention will be described hereinafter by way of example only, with reference to the accompanying drawings.

Within the current text of the illustrated exemplary embodiments, the connectivity procedure that is to be varied in accordance with the reasoning behind the update request comprises one or more of the security procedures associated with the update.

As will be appreciated, if the update is required for CSFB purposes, then in order to reduce the burden that delays within CSFB can place with the overall update procedure revised versions of the associated security procedures can be provided.

Figure 1:
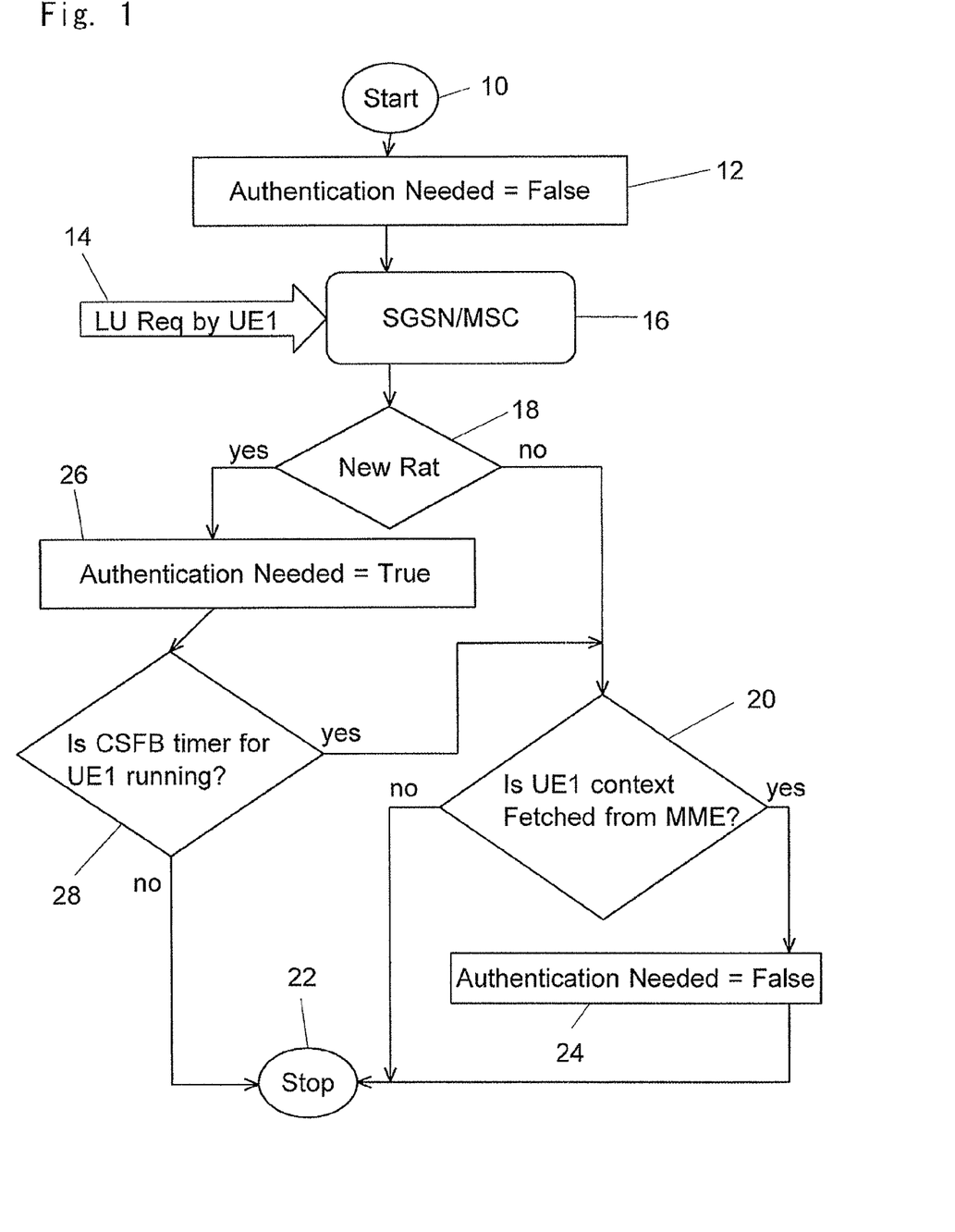
FIG. 1 is a flow diagram illustrating one particular aspect of the present invention.

As one example, revised version of the authentication procedure can be employed. It is of course noted that some network operators routinely employ such authentication for example, when RAT (Radio Access Technology) or PLMN (Public Land Mobile Network) changes are required. Generally under normal circumstances, the LA update procedures do not necessarily exhibit automatic delays. However, it is noted that if the LA update procedure occurs in relation to CSFB, the delay to the call setup is relatively large and disadvantageously noticeable. A revised security procedure according to the present invention can require that authentication is exercised only when merely needed for example, when it is identified that there is a problem with the UE context exchange between the MME (Mobility Management Entity) and the SGSN/MSC. As illustrated in FIG. 1, the authentication procedure can advantageously be skipped if required thereby advantageously reducing the delay experienced in the CSFB procedure.

In addition, or as an alternative, identity check procedures could be employed only when required and not necessarily routinely and in the same manner as the aforementioned authentication procedure.

Yet further, TMSI re-allocation procedures can likewise be employed only when required and not on a routine basis. Also, if required, a shorter version of the TMSI re-allocation within the LA accept message might be adopted rather than a stand alone TMSI re-allocation procedure.

Considerations in relation to the change the authentication procedure are illustrated in relation to FIG. 1. As will be seen, at the start 10 of the procedure, an indication of the requirement for authentication is provided at step 12 and prior to receipt of a location update request by a specifically identified User Equipment (UE1) 14 is received at the SGSN/MSC 16.

The SGSN/MSC 16 determines whether or not to switch to a new radio access technology is required at 18 and, if not, it is determined at step 20 whether or not the UE1 context have been fetched from the MME. If no such fetching of the context is determined at step 20, the procedure continues to its conclusion at step 22 as indicated. However, if at step 20, is determined at the UE1 context has been fetched from the MME, it is confirmed at step 24 it is confirmed that the status for the authentication only remains "false".

Returning to step 18, it is there determined that there has been a switch to a new radio access technology, the procedure continues to 26 where the status for the requirement for authentication is revised to "true" and a determination is subsequently made at step 28 as to whether a CSFB timer for the specific user equipment UE1 is still running. If at step 28, it is determined that the timer is still running, then the investigation at step 20 concerning fetching of the UE1 context from the MME is determined as before.

If, however, it is determined at step 28 that the CSFB timer is not running, then the procedure continues to its conclusion at step 22 as indicated.

Figure 2:
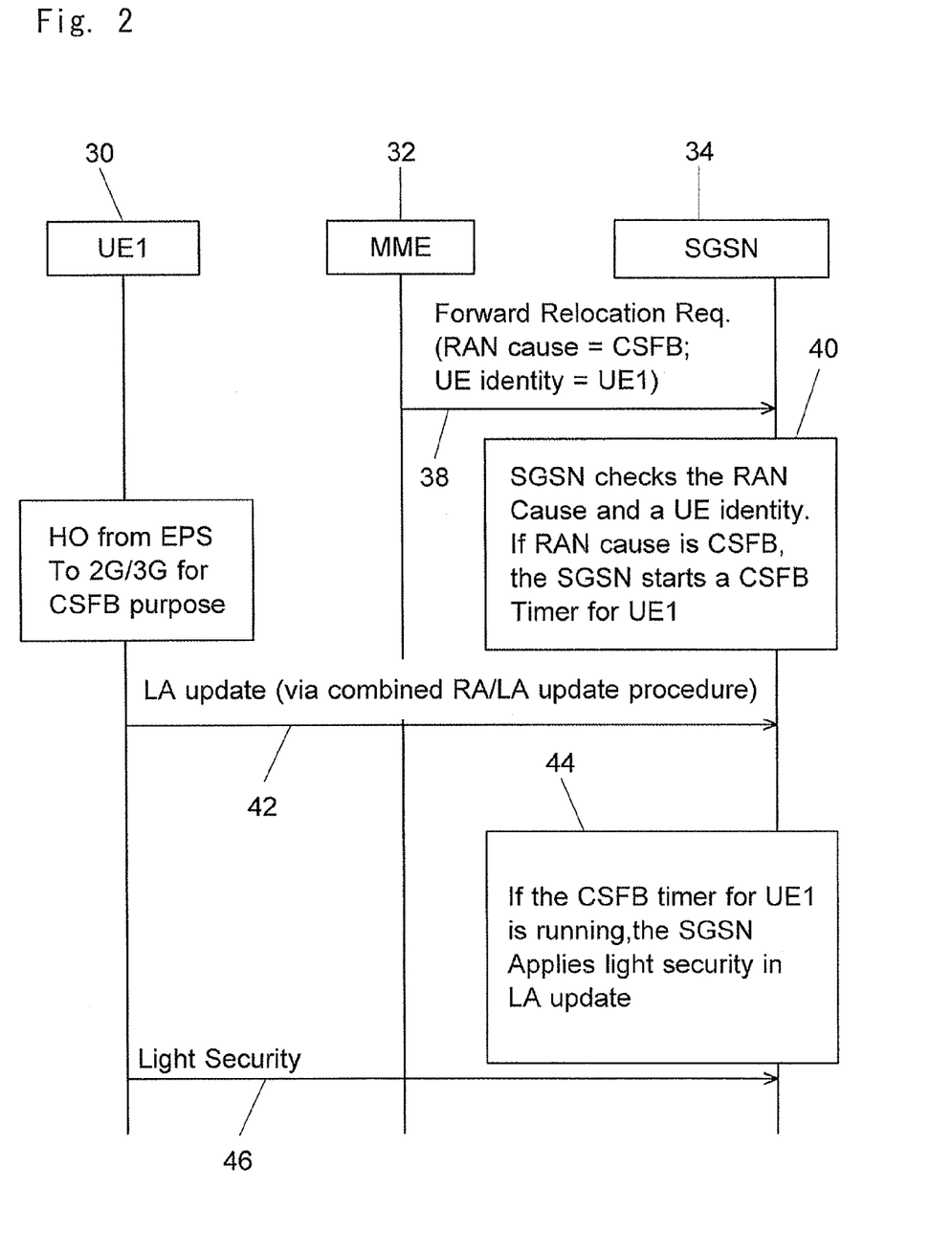
FIG. 2 is a signalling diagram between network elements according to an exemplary embodiment of the present invention.
Figure 3:
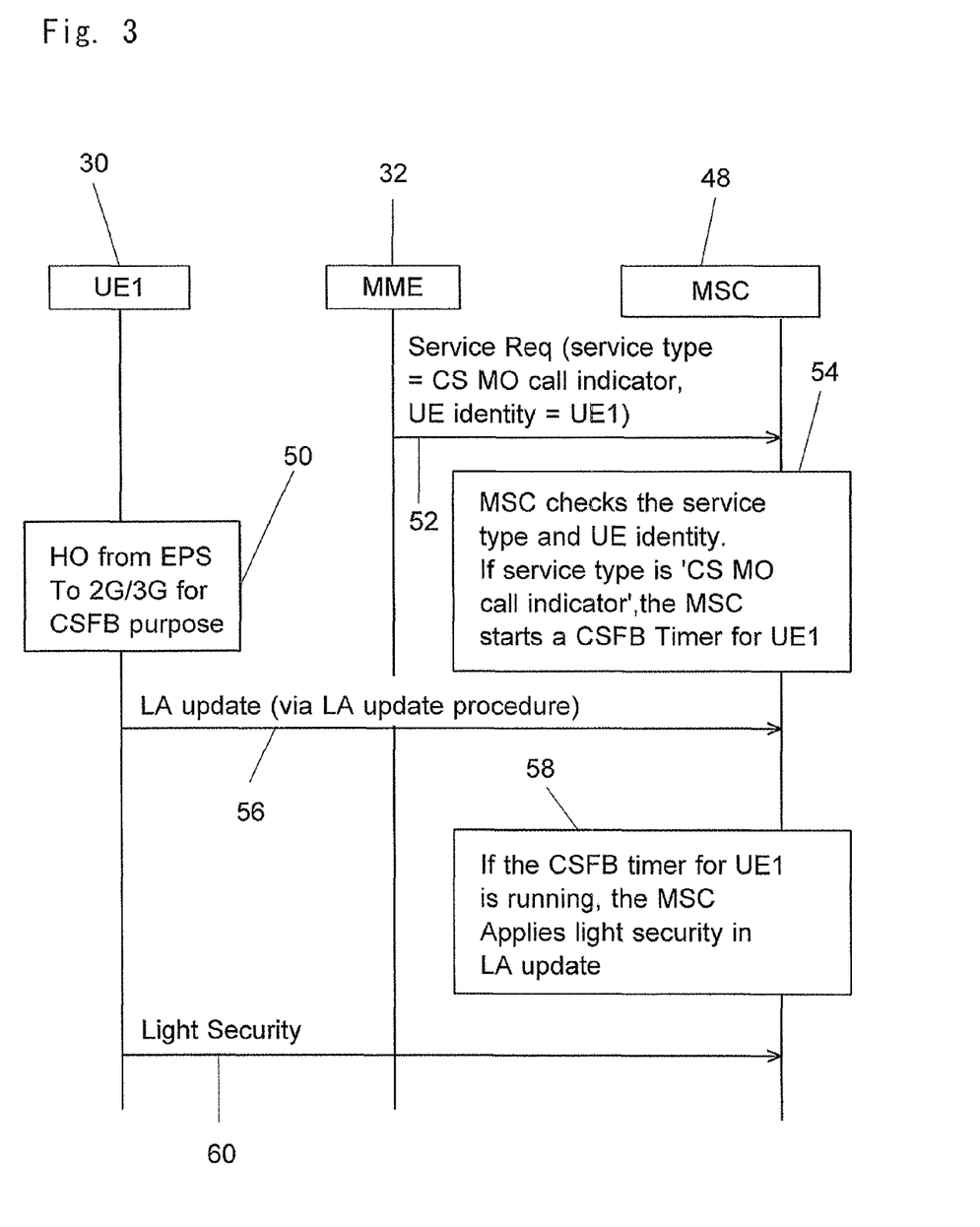
FIG. 3 is a further signalling diagram between network elements according to another aspect of the present invention.

An important aspect of the present invention therefore is the provision of the aforementioned CSFB timer and this is described further in relation to FIGS. 2 and 3 of the present application.

Turning now to FIG. 2, there is illustrated a signalling diagram between a user equipment 30, MME 32 and SGSN 34, a network system and wherein the user equipment 30 is evolved in a handover from an evolved packet system to a legacy 2G/3G system for example, CSFB purposes. As illustrated, the MME 32 issues a forward relocation request signal 38 which includes both indication of the cause for such a request (in this case that CSFB is required) and also confirms the identify of the specific user equipment 30.

Upon receipt of the request 38 the SGSN 34 functioning as a target network device checks and identifies both the cause so the aforementioned cause and the UE identify, and upon identifying the cause as CSFB-related, the SGSN 34 initiates a timer, referred to herein as the "CSFB timer" for that specific UE 30 and at step 40, with that timer running, should an actual LA update such as signal 42 be received from the user equipment 30, the SGSN 34 can be arranged to provide at step 44 less intense, or "light security versions" within the LA update procedure thereby limiting the delays that might arise from the SF procedure.

The appropriate "light security" procedures 46 are then employed as required.

That is, during a HO (Handover) for CSFB purposes to target 2G/3G system in NMO 1 configuration (see FIG. 2)—the target SGSN checks the "RAN cause" Ie and the UE identity in the Forward Relocation Request signal from source MME to target SGSN. If the value of the RAN cause indicates CSFB then the SGSN shall start a timer (let's call it "CSFB timer", of few seconds) for the UE that is in CSFB. If during the span of this CSFB timer the SGSN receives a request for LA update (by combined RA/LA update procedure) from the identified UE in CSFB, the SGSN will exercise light security during this LA update.

Turning now to FIG. 3, there is provided a signalling diagram according to another aspect of the present invention.

Again, a UE 30 and an associated MME 32 are indicated but, in this exemplary embodiment, the target network device comprises MSC 48.

As before, a handover is initiated from the user equipment 34 at step 50 from an Evolved Packet System to a legacy 2G/3G system for CSFB purposes but this time a Service Request signal with specific service type indicator that indicates CSFB and UE identifier (for example IMSI) 52 is provided by the MME 32 to the MSC 48.

The MSC checks the service type and UE identifier and, if it is noted that the service type comprises "CS MO (Mobile Originated) call indicators" or any other indicator that indicates a request for CSFB the MSC starts the CSFB timer for that specific user equipment 30 as indicated at 54.

Then, if, within the period of the aforementioned timer, an LA update signal 56 (and via an LA update procedure) is received from the UE 30 at the MSC 48, the reduced less intense, version of the security procedures are initiated such that "light security" functionality is provided as indicated at step 58.

During HO for CSFB purpose to target 2G/3G system in NMO II configuration and MSC not changed (see FIG. 3). If the CSFB is for MT (Mobile Terminated) call, the MSC already is aware of UE identity that is in CSFB. If the CSFB is for MO call, the MME indicates that to the MSC over the SGs interface (interface between the MME and the MSC/VLR (Visitor Location Register)) via "CS MO call indicator" (CSFB indicator). In both (MT and MO) cases the MSC starts a CSFB timer for that UE in CSFB. If during the span of the CSFB timer the MSC receives a request for LA update (by LA update procedure) from the identified UE in CSFB, the MSC will exercise light security during this LA update.

Figure 4:
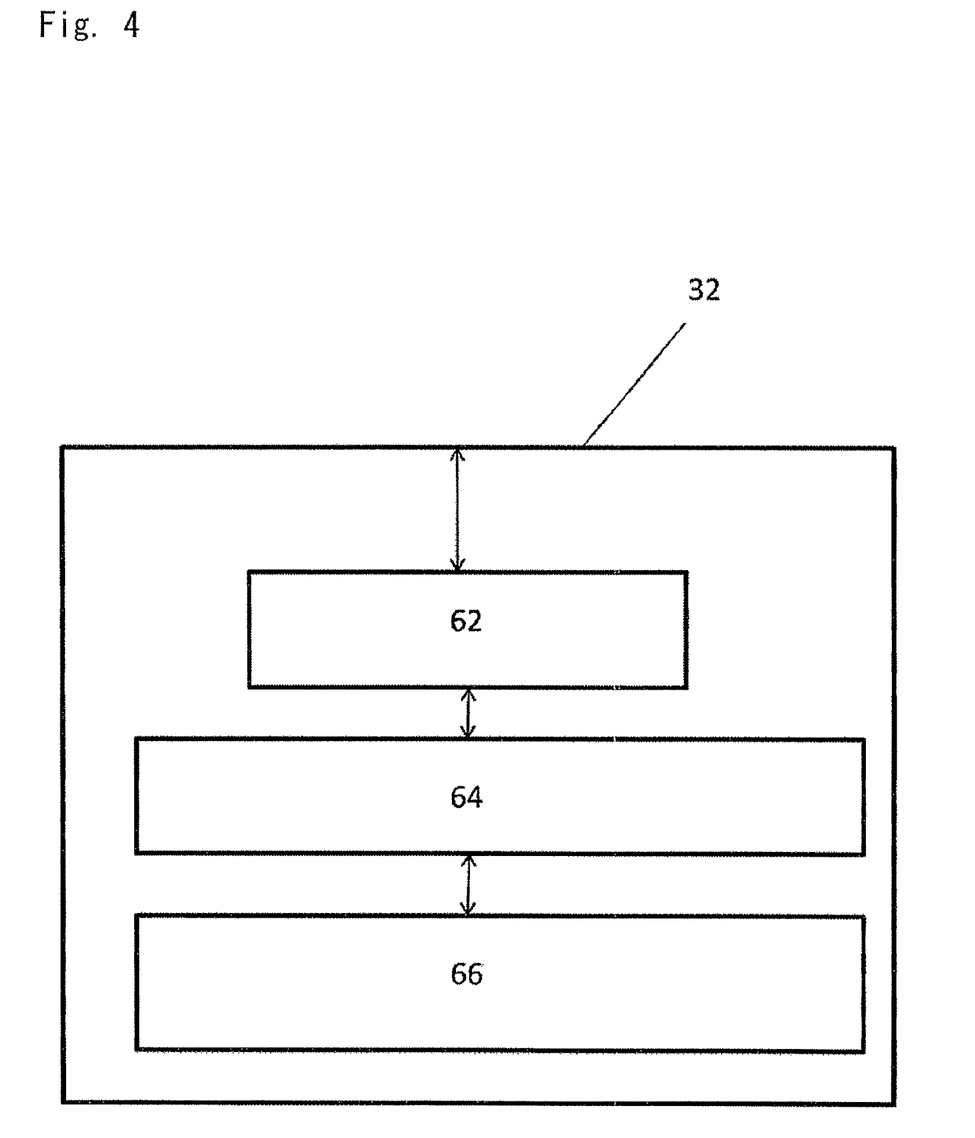
FIG. 4 is a schematic block diagram of a network element according to one exemplary embodiment of the present invention.

Turning now to FIG. 4, there is provided schematic illustration of a network device such as a mobile management entity 32 as illustrated in FIGS. 2 and 3.

The MME 32 includes transceiver arrangement and related interfaces 62, an appropriate control processor 64 and associated memory arrangement 66. As will be appreciated the control processor 64 is arranged to provide control signalling to the target network elements such as the SGSN 34 of FIG. 2 or the MSC 48 of FIG. 3 serving to provide service information to indicate the reasoning behind the change request.

Figure 5:
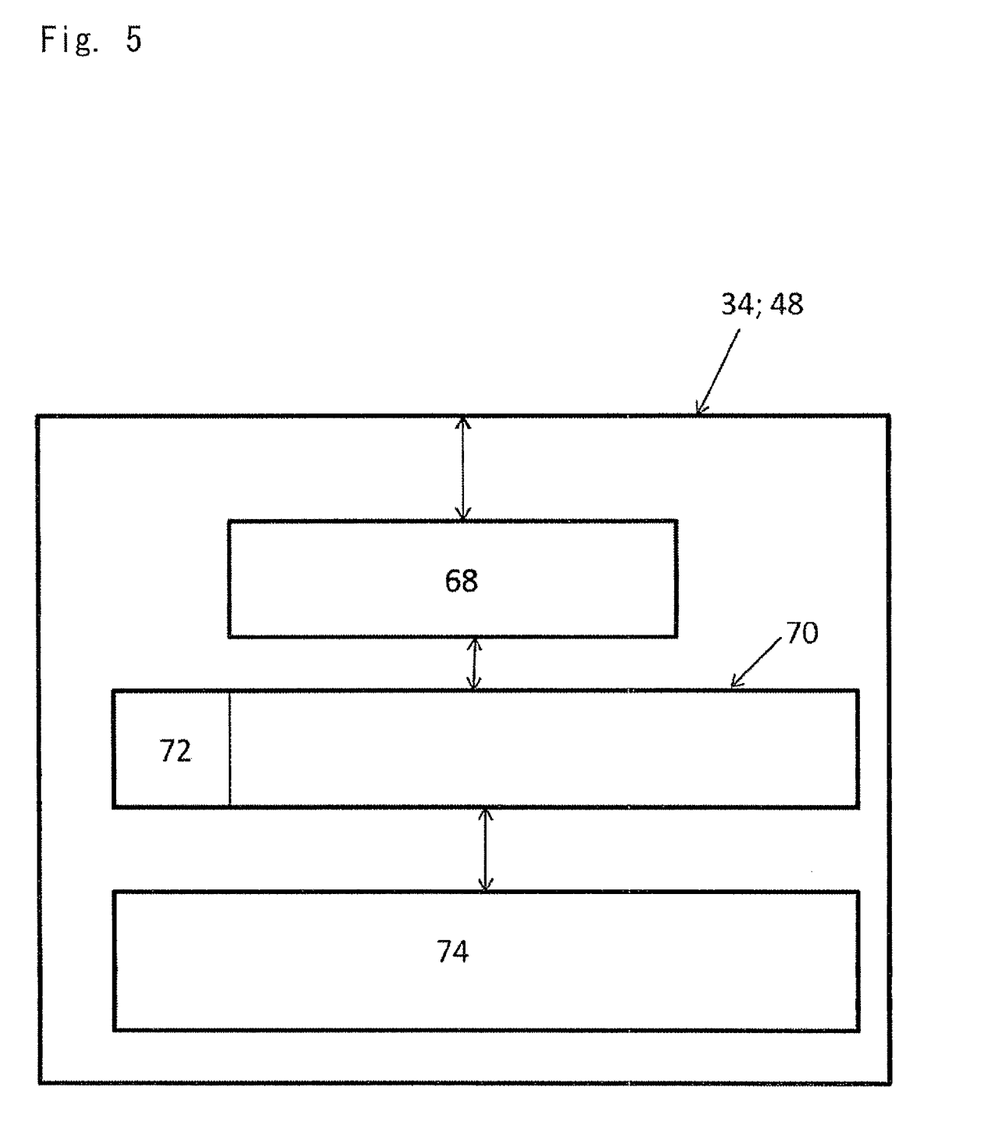
FIG. 5 is a schematic block diagram of a network element according to another exemplary embodiment of the present invention.

Turning now to FIG. 5, there is provided a schematic illustration of a target network elements such as the SGSN 34 of FIG. 2 and the MSC 48 of FIG. 3.

As illustrated, the target network element includes transceiver functionality and related interfacing 68 and which connects to a control processor 70 which includes specific timer functionality 72 so as to provide for the required time period within which an actual update request is monitored at the target network element as discussed hereinbefore.

Of course, the network target element 34, 48 also includes a memory arrangement 74 as indicated and it should of course be appreciated that the functionality of the device as illustrated in FIGS. 4 and 5 can be provided by way of software control instructions if required.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, the present invention can be materialized by a computer program for causing a CPU (Central Processing Unit) or the like to execute the processes shown in FIG. 2 or 3.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

This application is based upon and claims the benefit of priority from United Kingdom patent application No. 1002446.1, filed on Feb. 15, 2010, the disclosure of which is incorporated herein in its entirety by reference.

REFERENCE SIGNS LIST

30 UE
32 MME
34 SGSN
48 MSC
62 TRANSCEIVER ARRANGEMENT AND RELATED INTERFACES
64 CONTROL PROCESSOR
66 MEMORY ARRANGEMENT
68 TRANSCEIVER FUNCTIONALITY AND RELATED INTERFACING
70 CONTROL PROCESSOR
72 TIMER FUNCTIONALITY
74 MEMORY ARRANGEMENT

The invention claimed is:
1. A method of controlling a Location Area-based update procedure in a mobile radio communications network, the method comprising:
   determining the basis for the Location Area-based update request;
   varying connection procedures upon receipt of such request and responsive to the said determination; and varying the connection procedures from first procedures to second procedures having a burden lower than the first procedures in response to the basis indicating Circuit Switched Fall-Back, wherein the first procedures include a security procedure comprising at least one of authentication procedure, an identification procedure, and a TMSI (Temporary Mobile Subscriber Identity) re-allocation procedure, and wherein in the second procedures, the authentication procedure and the identification procedure are skipped, and a short version of the TMSI re-allocation procedure is adopted.

2. The method as claimed in claim 1, wherein the said determination controls the connection procedure of a network element.

3. The method as claimed in claim 1 further comprising:
providing at a network element, an indication of the said reason for the Location Area-based update request.

4. The method as claimed in claim 1, further comprising:
determining the said basis within a target network element.

5. The method as claimed in claim 4, wherein the said target network element comprises at least one of a Mobile Switching Centre and a Serving GPRS (General Packet Radio Service) Support Node.

6. The method as claimed in claim 1 wherein varying the connection procedure includes a determination of whether the procedure is required.

7. The method as claimed in claim 1 wherein determining the reason for the update request is based on service-type signaling.

8. The method as claimed in claim 7, wherein the service based signaling comprises a service request signal including an indicator of Circuit Switched Fall-Back.

9. The method as claimed in claim 8, wherein the service request signal is provided by a MME (Mobility Management Entity) to a MSC (Mobile Switching Centre) in Circuit Switched Fall-Back for mobile originated call.

10. The method as claimed in claim 1 wherein determining the said basis includes determining if Circuit Switched Fall-Back is required.

11. A method of controlling Circuit Switched Fall-Back within a mobile radio communications network and including the method of controlling Location Area-based update procedure according to claim 10.

12. The method as claimed in claim 1 further comprising:
an establishment of a time period responsive to result of the said determination, and further including monitoring for a Location Area-based update request during the said time period.

13. A non-transitory computer readable medium comprising instructions for carrying out a method as claimed in claim 1.

14. A mobile radio communications network device arranged for operation in a network including a plurality of terminal devices, the mobile radio communications network device being arranged to forward to a target network device an indication of basis for a Location Area-based update procedure, wherein the indication is used for the target network device to vary connection procedures, wherein the connection procedures are varied from first procedures to second procedures having a burden lower than the first procedures, when the basis indicates Circuit Switched Fall-Back, wherein the first procedures include a security procedure comprising at least one of authentication procedure, an identification procedure, and a TMSI (Temporary Mobile Subscriber Identity) re-allocation procedure, and wherein in the second procedures, the authentication procedure and the identification procedure are skipped, and a short version of the TMSI re-allocation procedure is adopted.

15. The network device as claimed in claim 14 and comprising a Mobile Management Entity.

16. A mobile radio communications network target device arranged for operation in the network including a plurality of terminal devices and further arranged to monitor for an indication from a network device as claimed in claim 14 of basis for a Location Area-based update procedure, and further arranged to vary a connection procedure responsive to the said monitoring.

17. The target device as claimed in claim 16 and arranged to vary connection procedure responsive to identification of a relocation request originating from a terminal device.

18. The target device as claimed in claim 16 and arranged to vary connection procedure responsive to identification of a service request originating from a terminal device.

19. The target device as claimed in claim 16 and arranged to vary connection procedure responsive to identification of a Circuit Switched Fall-Back originating from a terminal device.

20. The target device as claimed in claim 16 and arranged to vary the connection procedure responsive to the receipt of identifier of the terminal device.

21. The target device as claimed in claim 16 and comprising a Mobile Switching Centre.

22. The target device as claimed in claim 16 and comprising a SGSN (Serving GPRS Support Node) device.

23. The target device as claimed in claim 16 and including a unit that establishes a time period and arranged to monitor for receipt of a Location Area-based update during said time period and so as to initiate variation in the connection procedure.

24. The target device as claimed in claim 16 and arranged such that the varying of the connection procedure can include determination of whether the procedure is required.

* * * * *